United States Patent
Bohn (10) Patent No.: US 7,460,107 B1
(45) Date of Patent: Dec. 2, 2008

(54) COMPUTER INPUT DEVICE WITH MULTI-PURPOSE LIGHT GUIDE

(75) Inventor: David D. Bohn, Fort Collins, CO (US)

(73) Assignee: Microsoft Corporation, Redmond, WA (US)

( * ) Notice: Subject to any disclaimer, the term of this patent is extended or adjusted under 35 U.S.C. 154(b) by 447 days.

(21) Appl. No.: 11/102,717

(22) Filed: Apr. 11, 2005

Related U.S. Application Data (63) Continuation of application No. 10/382,931, filed on Mar. 7, 2003, now Pat. No. 7,129,929.

(51) Int. Cl.
G09G 5/00 (2006.01)
G06F 3/02 (2006.01)
G01J 1/42 (2006.01)

(52) U.S. Cl. .................... 345/166; 250/208.2
(58) Field of Classification Search .......... 345/161, 345/163–167; 250/221, 221.1, 208.2
See application file for complete search history.

(56) References Cited

U.S. PATENT DOCUMENTS

| | | | |
|---|---|---|---|
| 5,517,211 A | 5/1996 | Kwang-Chien | |
| 5,578,813 A | 11/1996 | Allen et al. | |
| 5,686,720 A | 11/1997 | Tullis | |
| 5,943,233 A * | 8/1999 | Ebina et al. | 700/85 |
| 6,256,016 B1 * | 7/2001 | Piot et al. | 345/166 |
| 6,421,045 B1 | 7/2002 | Venkat et al. | |
| 6,424,407 B1 | 7/2002 | Kinrot et al. | |
| 6,462,330 B1 | 10/2002 | Venkat et al. | |
| 6,486,873 B1 | 11/2002 | McDonough et al. | |
| 7,009,598 B1 * | 3/2006 | Bohn | 345/166 |
| 7,129,929 B1 * | 10/2006 | Bohn | 345/166 |
| 2003/0006965 A1 | 1/2003 | Bohn | |
| 2003/0142075 A1 | 7/2003 | Chin | |
| 2003/0142078 A1 | 7/2003 | Chin | |
| 2003/0201951 A1 | 10/2003 | Chin | |
| 2004/0084610 A1 | 5/2004 | Leong et al. | |
| 2004/0149894 A1 | 8/2004 | Tschirren et al. | |

FOREIGN PATENT DOCUMENTS

| | | |
|---|---|---|
| JP | 08137613 A | 5/1996 |
| KR | 2002050803 A | 6/2002 |

OTHER PUBLICATIONS

U.S. Appl. No. 10/382,931, filed Mar. 2003, Bohn.
U.S. Appl. No. 10/382,867, filed Mar. 2003, Bohn.

* cited by examiner

*Primary Examiner*—Richard Hjerpe
*Assistant Examiner*—Srilakshmi K Kumar
(74) *Attorney, Agent, or Firm*—Merchant & Gould P.C.

(57) ABSTRACT

A computer input device includes a light guide that illuminates a target area for imaging so as to permit tracking relative motion of a surface. The light guide also directs light to a window that is externally visible to a user of the device when the device rests upon a supporting surface. In one form, the light guide includes an entrance surface that receives light from a light source, together with two separated channels. The light guide directs a portion of the light incident upon the entrance surface through a first channel to the target area. The light guide further directs a portion of the incident light through a second channel so as to illuminate the window.

18 Claims, 9 Drawing Sheets

COMPUTER INPUT DEVICE WITH MULTI-PURPOSE LIGHT GUIDE

CROSS-REFERENCE TO RELATED APPLICATIONS

This application is a continuation of U.S. patent application Ser. No. 10/382,931, filed Mar. 7, 2003 and titled "Computer Input Device with Multi-Purpose Light Guide." Said application is hereby incorporated by reference in its entirety.

FIELD OF THE INVENTION

This invention relates generally to optical components usable in optically-tracking pointing and input devices such as computer mice. More particularly, this invention provides a light guide for illuminating a target area and for also illuminating a portion of an input device that is visible to a user.

BACKGROUND OF THE INVENTION

Computer input and other pointing devices, such as electronic mice, convert physical movement into movement of a cursor or other image across a computer screen. Previously, many such devices utilized mechanically driven encoder wheels and other moving components to detect direction and magnitude of motion, and to then convert that information into data for communication to a computer or other device. Optical surface tracking offers an improved method of motion detection. Instead of encoder wheels rotated by a ball rolling across a surface, an array of photo-sensitive elements generates an image of a desktop (or other supporting surface) portion when light from an associated illumination source (such as a light emitting diode) reflects from the desktop or other surface. Subsequent images are compared, and based on the correlation between images, the magnitude and direction of mouse motion may be determined. Exemplary optical tracking systems, and associated signal processing techniques, include those disclosed in commonly owned U.S. Pat. Nos. 6,172,354, 6,303,924 and 6,373,047.

An optically-tracking computer mouse typically includes an outer housing that is configured to be grasped by the user and moved across a supporting surface such as a desk top or a table. A region on a bottom portion of the housing is either transparent or open so that light may reach a portion of the supporting surface (or "target area") and be reflected back into the housing. A light source inside of the mouse, which is typically a LED, is selectively turned on and off so as to controllably illuminate the target area. Light from the LED reflects from the target area and is collected and focused by a lens (inside the mouse housing) through an aperture and onto a photosensing surface of an image sensor (also inside the housing). The image sensor then forms (sometimes in connection with other components) an image of the target area. Typically, the image sensor is attached to a printed circuit board (PCB).

Existing optically-tracking devices direct light to a target area in various manners. In some cases, the LED is positioned between the image sensor and the target surface. Although simple in some respects, this configuration can add additional steps to an assembly process, and can also be a potential source of errors because of improper alignment. Moreover, many commercially available LEDs are not optimized for direct illumination of a near-field object (such as a target area of a tracking surface), resulting in less-than-desirable illumination patterns. Other configurations use a light guide to direct light from a LED to the target area. Typically, a light guide is formed from light-transmissive material such as glass or plastic, and is positioned between the LED and the target area. Light from the LED enters the light guide at one end, reflects from one or more internal surfaces of the light guide, and then exits from another end of the light guide to illuminate the target area.

In another line of development, computer input devices have been configured to illuminate an external portion of the device that is visible to the user. This externally visible light addresses various issues. For example, a conventional mouse may be difficult to locate in low light conditions, potentially making mouse (and computer) use less efficient. More particularly, in order to enhance the visibility of the information displayed on a computer screen and to reduce glare from the screen, computers are often operated in either low or no light conditions. Operations requiring the use of the mouse are typically performed periodically, requiring the user to frequently move his or her hand from the keyboard to the mouse. Although the mouse is usually within reach of the user, it may be difficult to locate and orient the mouse if the user cannot easily see it. By the making mouse more visible, the user may spend less time fumbling for the mouse.

An externally visible light also provides other advantages. For example, such a light can be used as an indicator that the computer is still turned ON. In many cases, a housing containing the computer central processing unit (CPU) and other components may be located under a desk or table, or otherwise hidden from view. An ON/OFF indicator light located on the CPU housing might thus be difficult to see. If the computer has a screen saver feature, the user might not realize the computer is turned ON. A mouse, however, is normally placed in a more visible location. Even if a screen is blank and the CPU housing hidden from view, the user can easily determine if the computer is ON or OFF by glancing at the mouse. Further details of a computer input device with an externally visible light can be found in, e.g., commonly owned U.S. Pat. No. 6,486,873.

In existing configurations of optically tracking input devices with an externally visible light, one LED (or other light source) illuminates the target area and another LED (or other source) provides the externally visible light. This configuration presents several disadvantages. Two LEDs draw significant power and can reduce battery life in wireless or other battery operated components (e.g., a wired mouse connected to a battery powered laptop computer). Often, a separate PCB is necessary to hold the externally-visible LED. This increases assembly steps and manufacturing costs, as does the need to buy two LEDs for each device.

SUMMARY OF THE INVENTION

The present invention addresses many of the challenges described above. In particular, the present invention provides a light guide for illuminating a target area for imaging, and which also directs light to a portion of an input device that is externally visible to the user. In one embodiment of the invention, a light guide is provided for use in a computer input device, such as a mouse, having an optically-tracking motion sensor. The light guide includes an entrance surface that receives light emitted by a light source. The light guide has a first channel that directs light from the entrance surface to a tracking region of the input device, as well as a second channel that directs light from the entrance surface to an illumination region of the input device.

In another embodiment, a computer mouse has a substantially flat outer surface configured for contact with a supporting surface and which is hidden from view when the mouse is placed upon a supporting surface. The mouse also has a visible outer surface that extends from the boundary of the flat outer surface, and a light emitting diode. A tracking region is formed in a portion of the flat outer surface and an illumination region is formed in a portion of the visible outer surface. The mouse further includes a light guide for transmitting a portion of the LED light to the tracking region and a portion of the LED light to the illumination region.

Other features and advantages of the invention are described herein and in the accompanying drawings, or will be apparent to persons skilled in the art once provided with the following description and accompanying drawings.

DETAILED DESCRIPTION OF THE INVENTION

The invention is described using an optically-tracking computer mouse as an example of a device into which the invention may be incorporated. However, the invention is not limited to computer mice.

Figure 1A:
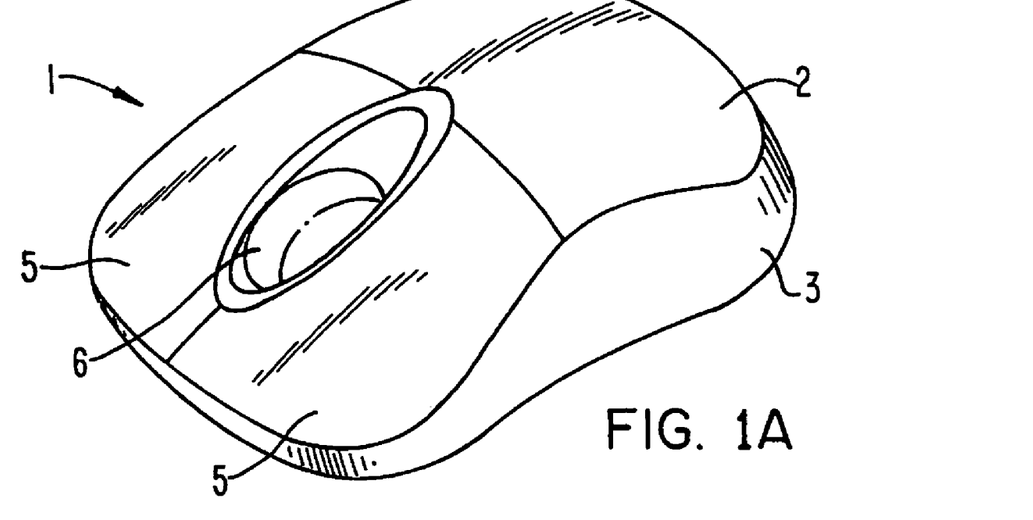
FIGS. 1A and 1B are perspective views of a computer mouse according to one embodiment of the invention.
Figure 1B:
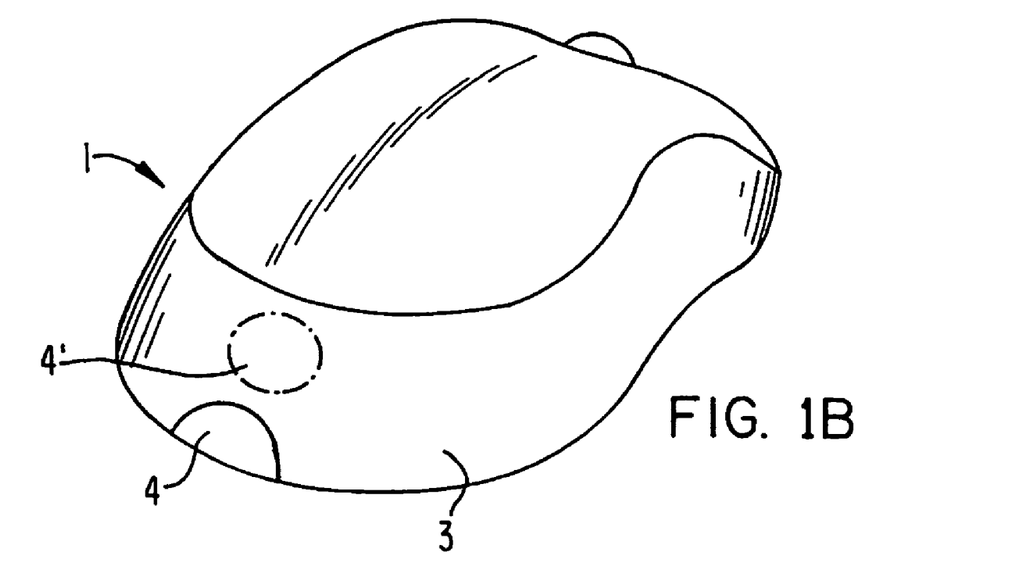

FIGS. 1A and 1B are perspective views of a mouse 1. Mouse 1 includes an upper housing 2 and a lower housing 3. Lower housing 3 has a substantially flat bottom surface that is arranged to rest on a supporting surface such as a desk or table top. Upper housing 2 is shaped to comfortably interface with and support a human hand. Mouse 1 further includes an externally-visible light window 4. Light window 4 may be transparent or translucent, and may also be color tinted. Window 4 is arranged so that light from an internal light source (as described more fully below) is visible to a mouse user when the lower housing 3 of mouse 1 rests upon a supporting surface. Window 4 could be located elsewhere on mouse 1; an example of a possible alternate location includes, but is not limited to, window 4'. In use, mouse 1 is connected to a computer (not shown) and provides signals to the computer to control a cursor or other screen image. As is known in the art, mouse 1 may also contain one or more actuatable buttons 5, a scroll wheel 6, and/or other mechanisms for receiving user input and converting same to signals for transmission to the computer. Mouse 1 may communicate with and receive power from the computer via a wired connection (not shown), or may be wireless and receive power from a battery within mouse 1 (also not shown).

Figure 2:
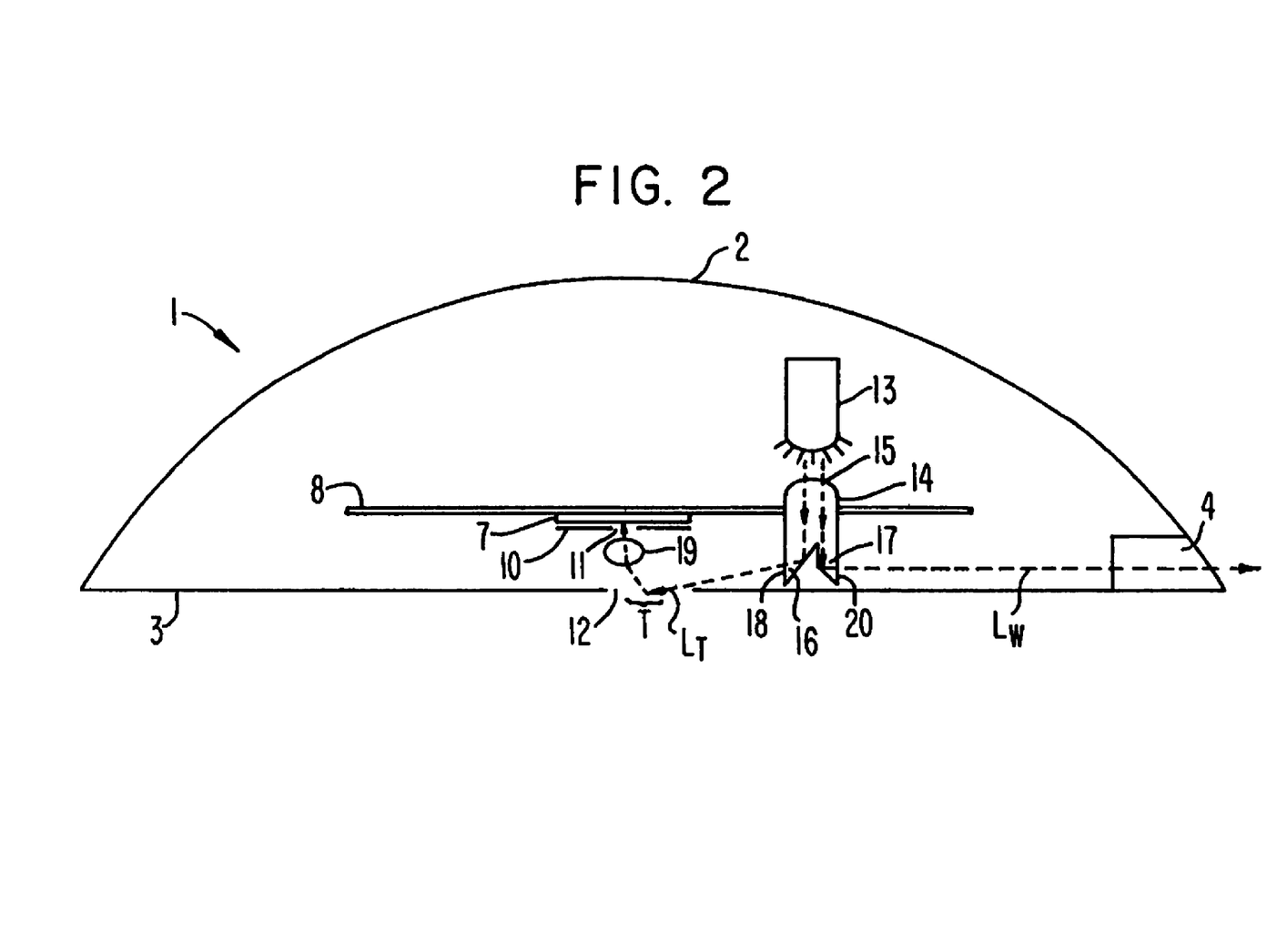
FIG. 2 is a partially schematic cross section of the mouse of FIG. 1.

FIG. 2 is a partially schematic cross-section of mouse 1 taken along the lengthwise centerline. Because mouse 1 is an optically tracking device, mouse 1 includes an image sensor 7. Image sensor 7 is located within mouse 1 and attached to a printed circuit board (PCB) 8. Image sensor 7 is positioned on the bottom of PCB 8 such that a photo sensitive region of image sensor 7 is situated over an opening 12 in bottom housing 3. In other embodiments, image sensor 7 might be positioned on the top of PCB 8 and over an opening in PCB 8. Located over image sensor 7 is an aperture plate 10 having an aperture 11 formed therein. Aperture 11 is also generally above opening 12 formed in bottom housing 3.

LED 13 illuminates target area T. Unlike prior art systems, LED 13 also illuminates window 4. Because window 4 is transparent or translucent, light from LED 13 is visible to a user of mouse 1 while mouse 1 is resting on a supporting surface. In order to achieve this advantage, mouse 1 further includes a divided light guide 14. Light guide 14 has an upper surface 15 which receives light from LED 13, and two light directing channels 16 and 17. Light from LED 13 enters light guide 14 through upper surface 15 and is divided between two separated channels. A portion of the light is directed through channel 16 and exits light guide 14 through exit face 18. This light, shown schematically as $L_T$, exits mouse 1 through opening 12 to illuminate target area T. A portion of that light is then reflected by the target area T back through opening 12. Located between opening 12 and aperture 11 is an imaging lens 19. Reflected light entering mouse 1 through opening 12 is focused by imaging lens 19 and directed through aperture 11 onto the photo-sensitive surface of image sensor 7.

Another portion of the light from LED 13 entering light guide 14 is directed through channel 17 and exits channel 17 through exit face 20. This light, shown schematically as $L_W$, then illuminates window 4 and is visible to a user of mouse 1. In the embodiment schematically shown in FIG. 2, light generally exits from faces 18 and 20 in directions that are approximately 180° apart in the horizontal plane (i.e., the plane of the bottom housing 3 in FIG. 2). In other embodiments, light from exit faces 18 and 20 may be separated by other angles. For example, and referring to FIG. 1B, alternate location 4' could instead be located on (or toward) one of the sides of mouse 1. Light from exit face 20 could also be directed upward or downward.

Figure 3:
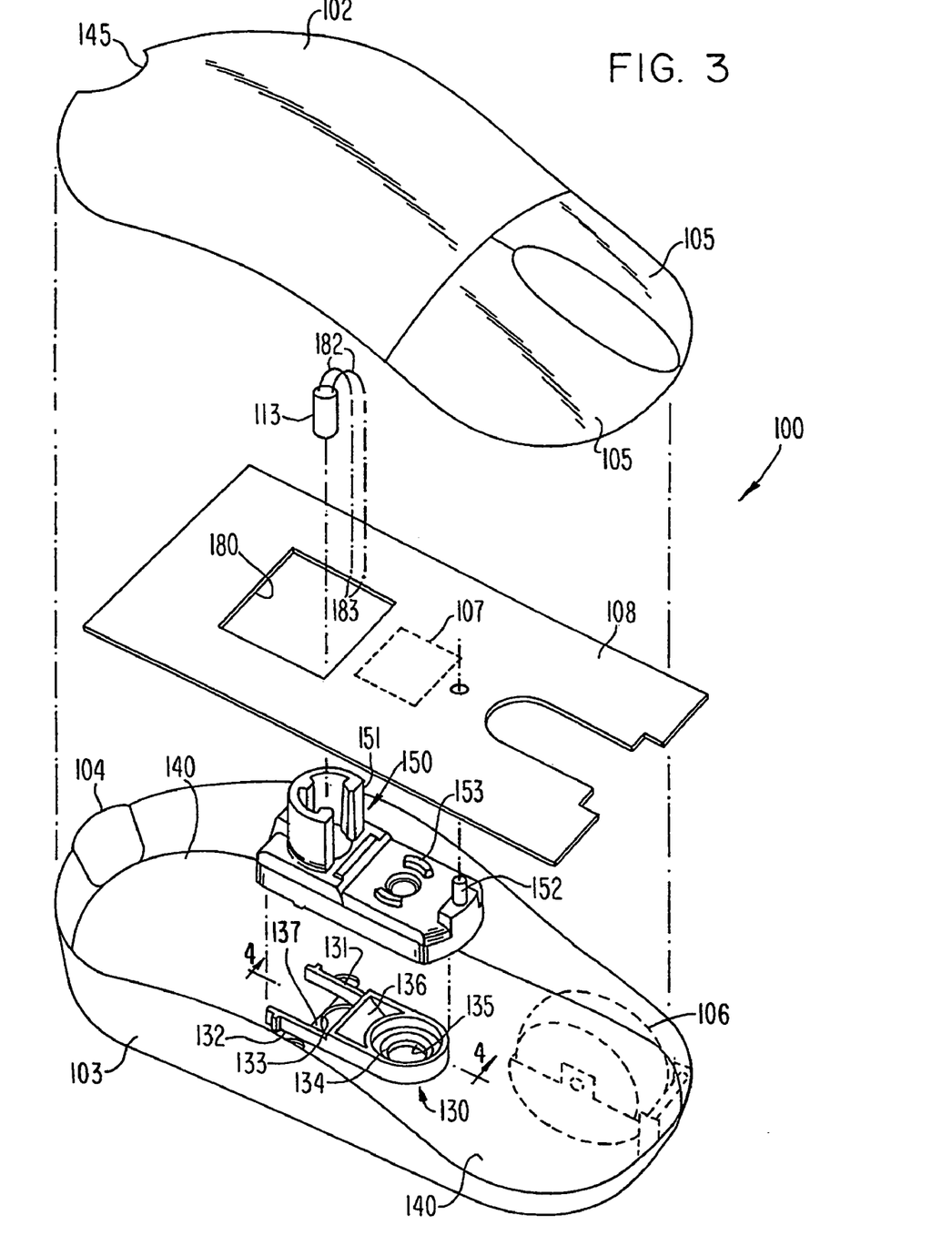
FIG. 3 is an "exploded" view of a computer mouse incorporating an optical structure according to one embodiment of the invention.
Figure 4:
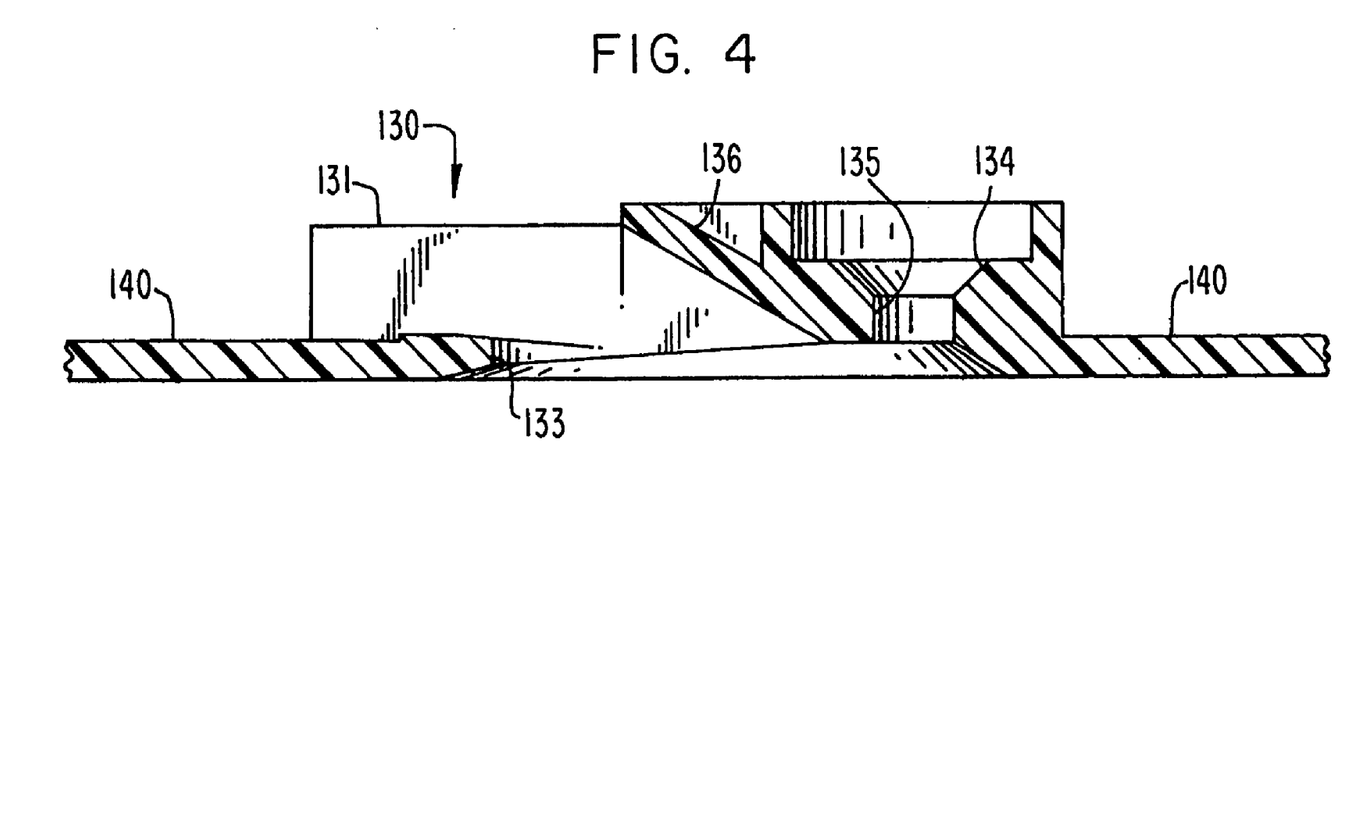
FIG. 4 is a cross section taken along lines 4-4 of FIG. 3.

FIG. 3 is an "exploded" view of portions of computer mouse 100 according to one embodiment of the invention. Housing base 103 is configured to rest upon and move over a desk top or other tracking surface, as well as to support and contain other components. Housing base 103 may be molded from ABS (acrylonitrile butadiene styrene) or other suitable material. Formed in the interior of housing base 103 is an access/support structure 130. FIG. 4 is a cross section of access/support structure 130 taken along line 4-4 in FIG. 3. Access/support structure 130 includes two walls 131 and 132 that extend upward from the interior bottom surface 140 of housing base 103. Located between walls 131 and 132 is a transmission hole 133. Located at the other end of access/support structure 130 is a well 134. Located in the center of well 134 is a receiving hole 135. Separating well 134 and hole 133 is a baffle 136. Located on one end of mouse 100 opposite the gap between walls 131 and 132 is window 104. In one embodiment, window 104 is a transparent or translucent insert attached to housing base 103, housing base 103 being otherwise opaque.

Window 104 fits into a cutout 145 in upper housing 102 when mouse 100 is assembled. In other embodiments, window 104 could be located entirely within upper housing 102. Upper housing 102 may have one or more buttons 105, an opening for a scroll wheel 106, and/or other mechanisms for receiving user input. Mouse 100 would typically include numerous other components such as a battery (if mouse 100 is wireless), various connectors, cabling, etc. So as not to obscure FIG. 3 with unnecessary detail, these additional components are not shown, but would be understood as present by persons skilled in the art.

Fitting over access/support structure 130 is optical structure 150. Located on one end of optical structure 150 and extending upward is LED support 151. Also located on optical structure 150 and extending upward may be a positioning post 152 and a spacer/shield wall 153. As shown in FIG. 3, positioning post 152 cooperates with a hole in PCB 108 to position and stabilize optical structure 150 with respect to PCB 108. Spacer/shield wall 153 may also be formed so as to position and stabilize optical structure 150 with respect to PCB 108. In alternate embodiments, either or both of positioning post 152 and spacer/shield wall 153 may be absent. When mouse 100 is assembled, LED support 151 extends through an opening 180 in PCB 108. Image sensor 107 is positioned adjacent to opening 180 on the underside of PCB 108. LED 113 is positioned vertically downward inside of LED support 151 (see FIG. 9), and leads 182 from LED 113 are soldered to PCB connection points 183. Different types of LEDs may be used in connection with the invention. In one preferred embodiment, a T1-3/4 size LED producing light at approximately 630 nm is used. Such a LED is available from Agilent Technologies of Palo Alto, Calif. having part number HLMP-EG24-RU000. LEDs producing light at other wavelengths and having other or different features may also be used. Light sources other than LEDs could also be used.

Image sensor 107 contains multiple light sensitive elements and can be used to create electrical signals representing an image. In one preferred embodiment, image sensor 107 is an integrated circuit containing both the light sensitive elements and the circuitry for converting the received light into electrical signals. On such device is described in commonly-owned U.S. patent application Ser. No. 10/305,062, titled "Photo-Sensor Array for Motion Detection" and filed Nov. 27, 2002, incorporated by reference herein. Other image sensor integrated circuits are known in the art and are commercially available. One such sensor is available from Agilent Technologies and has part number ADNS-2620. Other image sensing components are described in the aforementioned U.S. Pat. Nos. 6,172,354, 6,303,924 and 6,373,047 (including documents referenced therein). In other embodiments, image sensor 107 may only contain light sensitive components, with the associated conversion circuitry located elsewhere.

Figure 5:
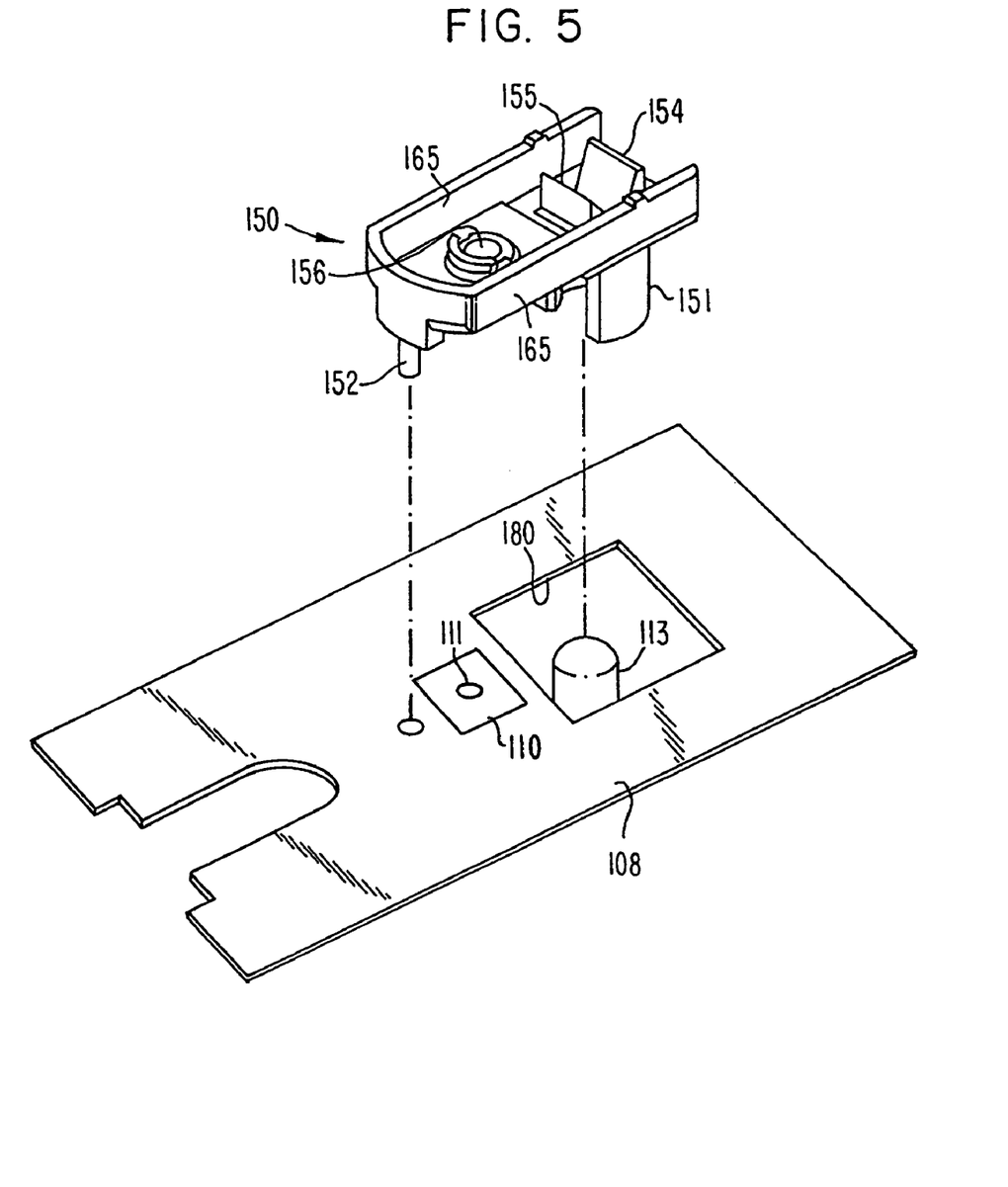
FIG. 5 is an inverted "exploded" partial view of the computer mouse of FIG. 3.

FIG. 5 is similar to FIG. 3, but inverted so as to expose the underside of PCB 108 and optical structure 150. FIG. 5 shows LED 113 in place, but omits housing base 103 and upper housing 102. Aperture plate 110 covers image sensor 107 (not shown in FIG. 5). In other embodiments, aperture plate 110 could be situated on the underside of PCB 108 and image sensor 107 on the upper side of PCB 108, with an opening in PCB 108 between image sensor 107 and aperture plate 110. Aperture plate 110 may be integrated with image sensor 107 prior to attachment to PCB 108, may be formed as an integral component of the image sensor, or may be attached as a separate piece to PCB 108. Exposed on the underside of optical structure 150 are two light guide channels 154 and 155, which are further described below. Also shown on the underside of optical structure 150 is imaging lens 156 (also described below).

Figure 6:
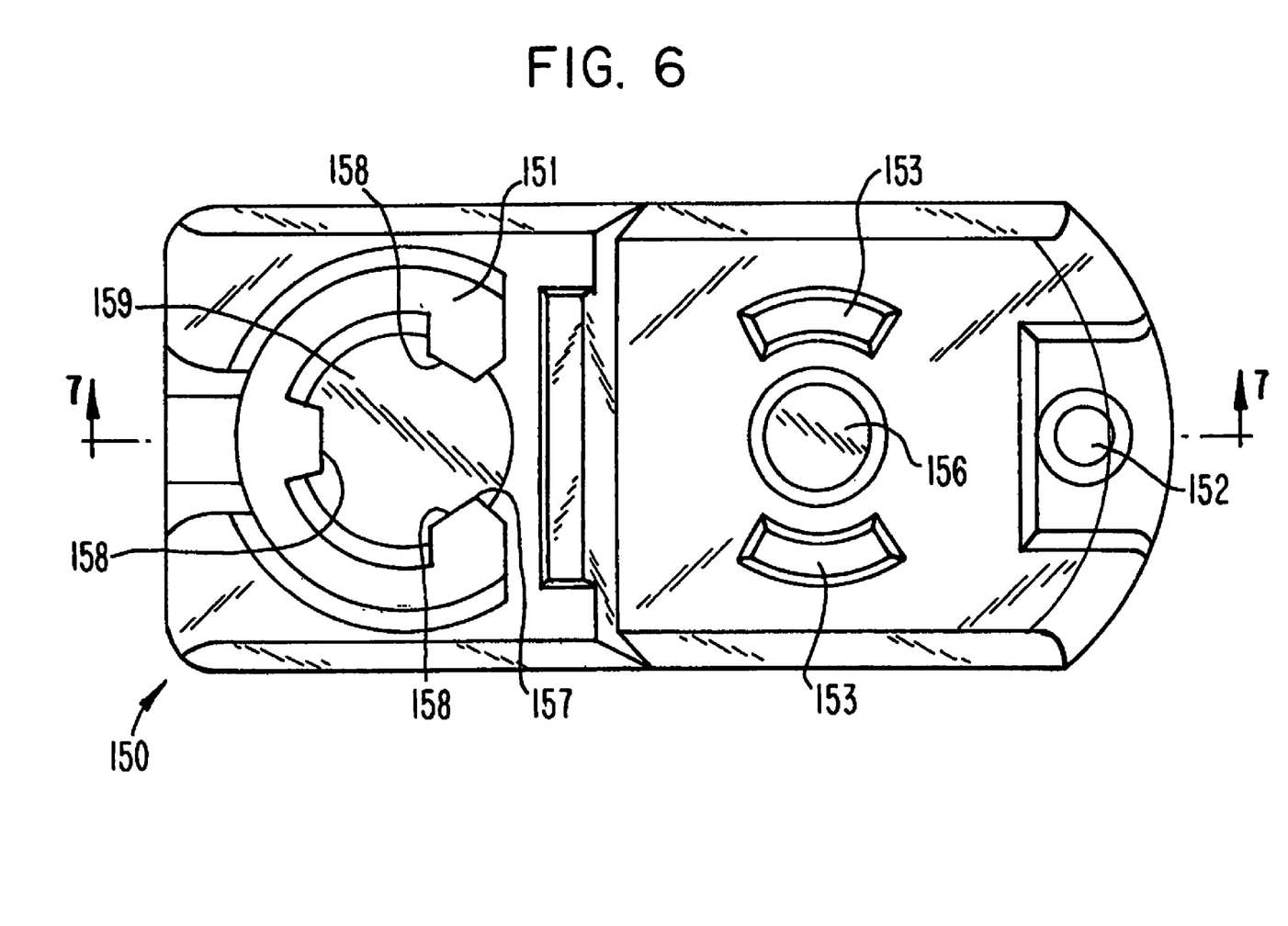
FIG. 6 is a top view of an optical structure according to one embodiment of the invention.
Figure 7:
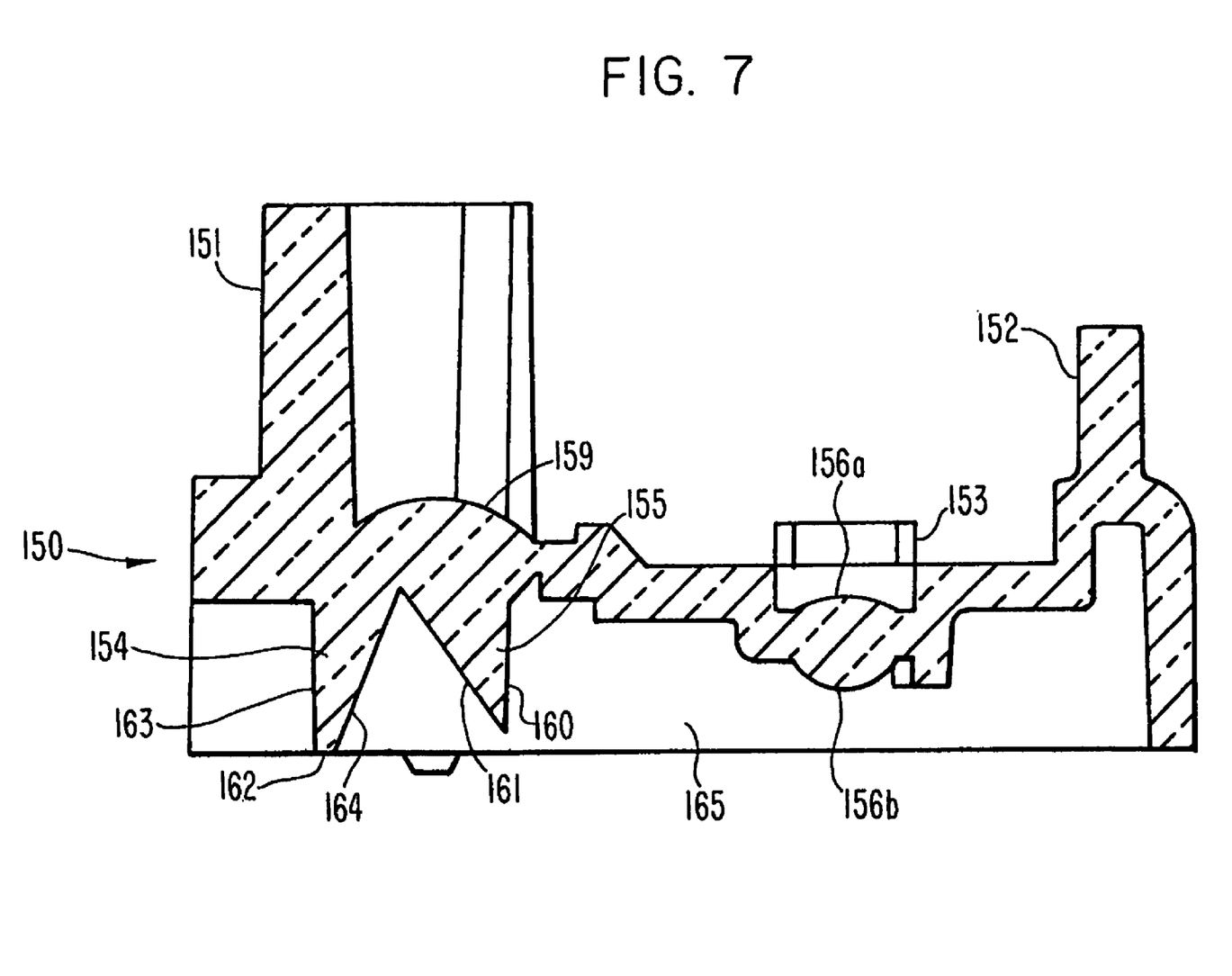
FIG. 7 is a cross section taken along lines 7-7 of FIG. 6.

FIGS. 6 and 7 show optical structure 150 in more detail. FIG. 6 is a top view of optical structure 150. FIG. 7 is a cross section of optical structure 150 taken along lines 7-7 of FIG. 6. LED support 151 is formed as a hollow cylinder, and has a vertical opening 157 on one side. Upon assembly, LED 113 is positioned inside the cylinder of LED support 151 and pointing vertically downward. Three vertical locating ridges 158 are formed inside of LED support 151 and serve to align LED 113. Formed in the bottom of LED support 151 is a collection lens 159. Collection lens 159 collects light emitted by LED 113 and directs that light to the tracking surface target area via channel 155 and to window 104 via channel 154. Also formed in optical structure 150 is an imaging lens 156. Imaging lens 156 collects and focuses light reflected from a target area and directs that light through aperture 111 in aperture plate 110.

Light from LED 113 strikes the upper surface of collection lens 159 and is divided between channels 154 and 155. The portion divided into channel 155 is used to illuminate a target area for imaging by image sensor 107. Channel 155 has an exit face 160 and a reflecting face 161. Reflecting face 161 forms a Total Internal Reflecting (TIR) surface. Light travels through channel 155 and strikes the TIR surface of reflecting face 161. The light is then reflected by the TIR surface of reflecting face 161 and exits channel 155 through exit face 160. Another portion of the light emitted by LED 113 and entering collection lens 159 is diverted to channel 154. This diverted light is then reflected by a TIR surface of reflecting face 164 of channel 154, and exits channel 154 through exit face 163. Reflecting face 164 and exit face 163 may be separated by a horizontal face 162. Light divided into channel 154 is used for illuminating window 104. Channels 154 and 155 are separated by a space bounded by the reflecting face 161 of channel 155 and by reflecting face 164 of channel 154.

As seen in FIGS. 5 and 7, a vertical wall 165 surrounds the underside of optical structure 150 on several sides. However, one side is open so that light exiting channel 154 through exit face 163 may reach window 104. Upon assembly, optical structure 150 fits over access/support structure 130 (FIG. 3), with walls 165 of optical support structure 150 surrounding walls 131 and 132 of access/support structure 130. Channels 154 and 155 rest between walls 131 and 132.

Optical structure 150 is preferably molded as an integral component. Possible materials for optical structure 150 include clear polystyrene available from BASF Corporation of Mount Olive, N.J., grade 148G KG21; clear polystyrene available from Nova Chemicals Corporation of Moon Township, Pa., grade PS1300; LEXAN polycarbonate resin available from GE Plastics of Fairfield, Conn., grade 121R, color 1111; and MAKROLON polycarbonate resin available from Bayer Polymers of Pittsburgh, Pa., grade 2405, color 1000. Other possible materials include acrylic, cyclic olefin copolymer, SAN styrene blend and NAS styrene blend.

Imaging lens 156 includes upper and lower convex lenses $156_a$ and $156_b$. The refractive power and other optical properties of imaging lens 156 may vary based upon distance from image sensor 107, distance of image sensor 107 above the tracking surface, the specific design of image sensor 107, and other configuration choices. The determination of imaging lens optical requirements is within the routine ability of a person skilled in the art once provided with the descriptions herein and various design parameters. Similarly, the preferred refractive power and other optical properties of collection lens 159 may vary based on parameters such as size of LED 113, size of channels 154 and 155, distances from a target area, desired output illumination through window 104, and other configuration choices. The determination of collection lens optical requirements is likewise within the routine ability of a person skilled in the art once provided with the descriptions herein and the relevant design parameters.

Figure 8:
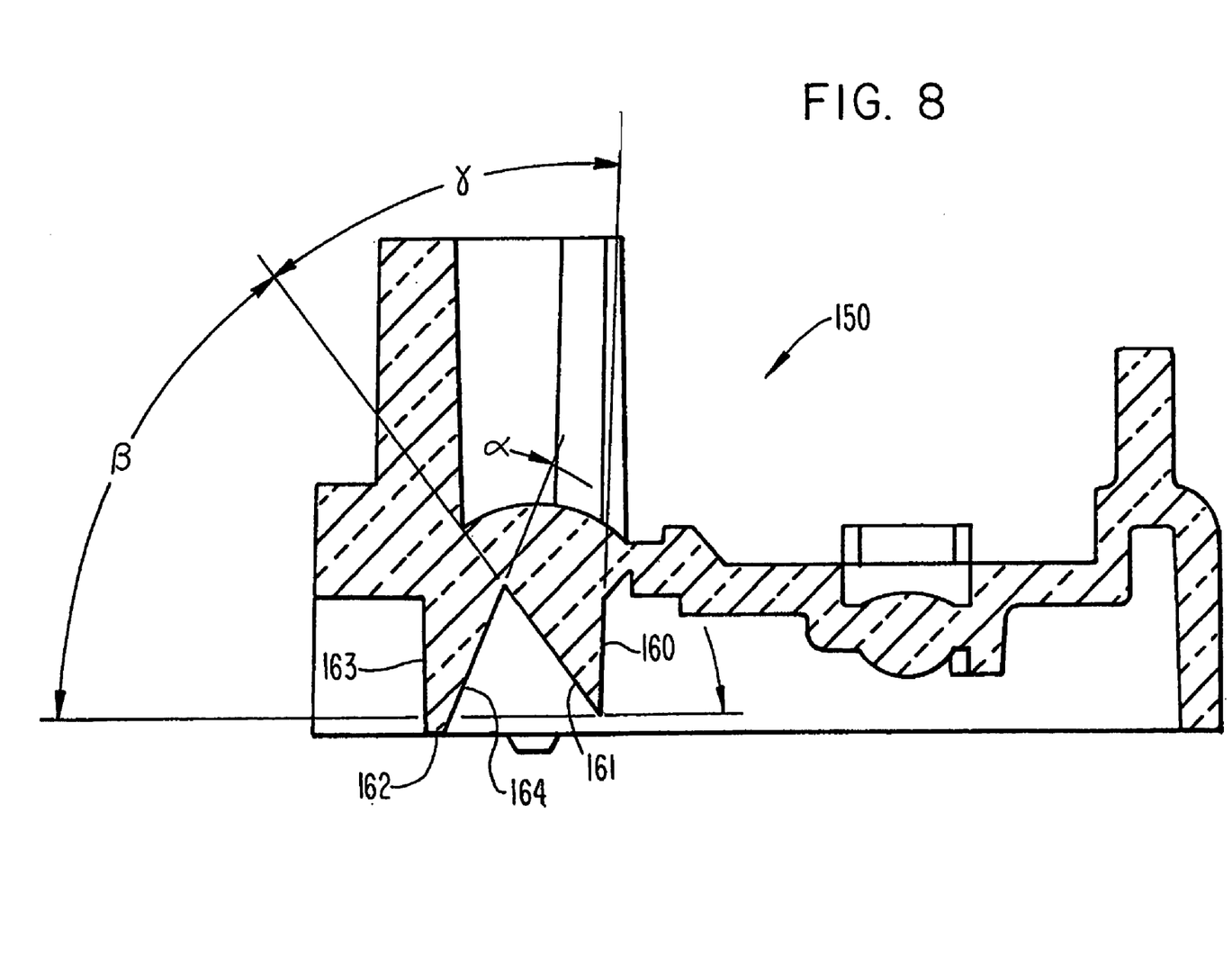
FIG. 8 is another cross section similar to that of FIG. 7, but with various angles labeled.

In one embodiment, approximately 80% of light entering collecting lens 159 is directed to channel 155, and approximately 20% of the light entering collecting lens 159 is directed to channel 154. In that embodiment, angle α (FIG. 8) is approximately 67.5°, angle β is approximately 52° and angle γ is approximately 90°−(β+2)°. In other embodiments, approximately 70%-90% of light entering collecting lens 159 is directed to channel 155, and approximately 10%-30% of light entering collecting lens 159 is directed to channel 154.

Figure 9:
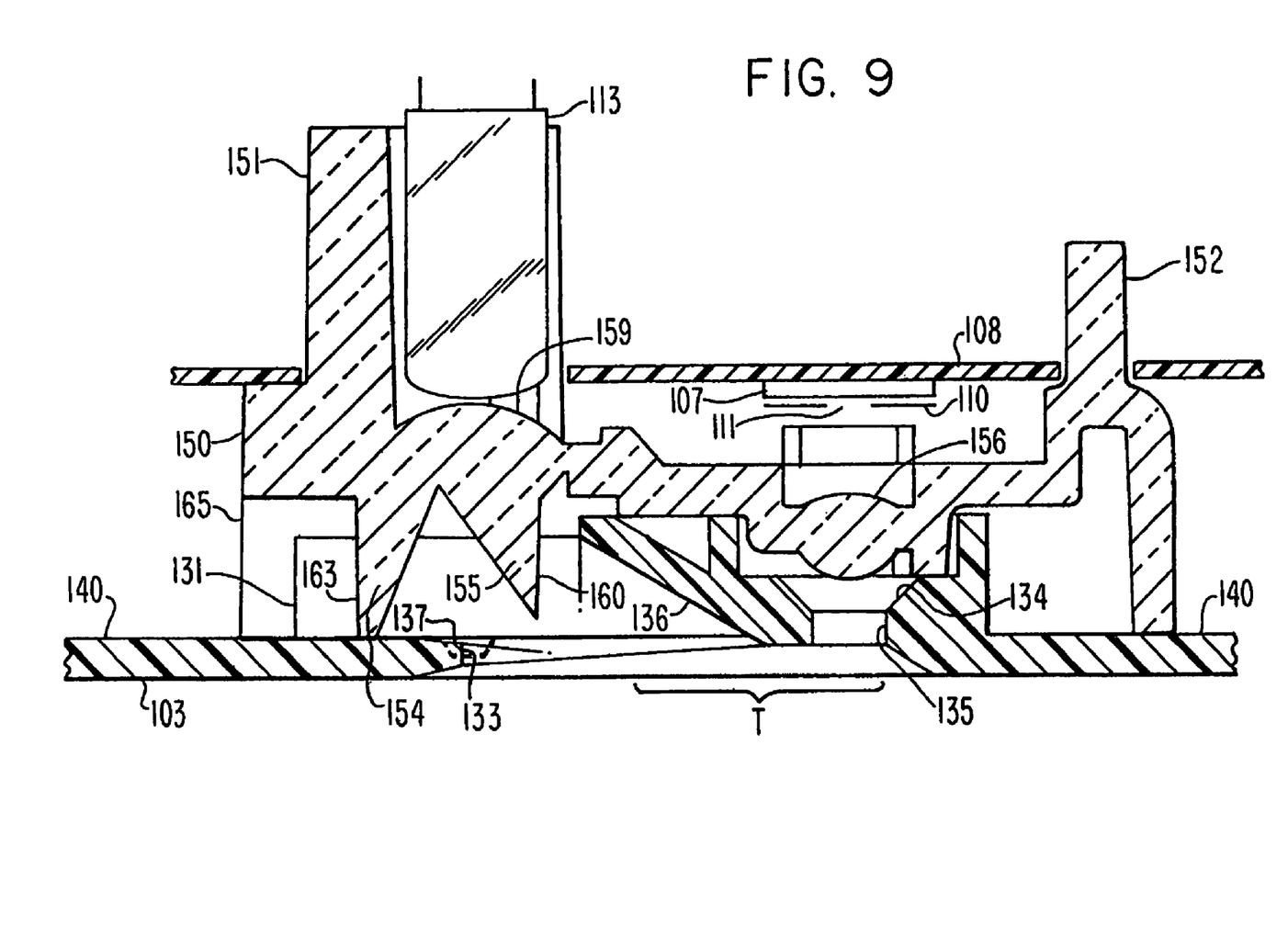
FIG. 9 is a cross section of an optical structure shown in FIG. 7 when assembled with other components.

FIG. 9 is a cross section of optical structure 150, access/support structure 130, PCB 108, image sensor 107 and LED 113 in an assembled condition. Channels 154 and 155 rest between walls 131 and 132 (not shown in FIG. 9) of access/support structure 130. Baffle 136, together with a beveled edge 137 on transmission hole 133, defines boundaries for an angled path for light from channel 155 to target area T. The bracket above the "T" in FIG. 9 only approximates the location and extent of the target area for purposes of illustration. Baffle 136 also prevents or minimizes stray light from reaching imaging lens 156. Light exiting from exit face 160 of channel 155 shines upon and illuminates target area T. A portion of this light is then reflected upward from target area T through entrance hole 135 to imaging lens 156. Imaging lens 156 then collects and focuses this reflected light and directs it into aperture 111 of aperture plate 110. The light then passes through aperture 111 and reaches the photosensitive elements of image sensor 107. Light exiting from exit face 163 of channel 154 shines upon window 104 and is visible to a user of mouse 100 while mouse 100 rests upon a supporting surface.

Although several examples of carrying out the invention have been described, those skilled in the art will appreciate that there are numerous variations and permutations of the above described examples that fall within the spirit and scope of the invention. As but one example, a multi-channel light guide according to the invention need not be used in conjunction with a corresponding support structure such as access/support structure 130. Similarly, a multi-channel light guide according to the invention need not be formed as part of a unitary optical structure having other optical components or supporting structures. As another example, the externally visible light need not be in the shape of window 104. Indeed, a window may be omitted, with light instead shining through an opening in the mouse housing that is visible to the user. Numerous other configurations are possible. These and other modifications are within the scope of the invention, which is only limited by the attached claims.

The invention claimed is:

1. A computer input device, comprising:
a housing, the housing including
a first region through which light may be transmitted and received for optically tracking relative motion of a tracking surface, and
a second region through which light may be transmitted and which is externally visible to a device user when the first region is adjacent to a tracking surface;
a light source contained within the housing;
a light guide including at least two channels separated from one another, the light guide formed so as to:
receive light emitted by the light source,
divide at least a portion of the received light between the at least two channels,
direct a portion of the divided light from a first of the at least two channels to the housing first region, and
direct a portion of the divided light from a second of the at least two channels to the housing second region; and
an image sensor contained within the housing and positioned to receive light from the light guide after light directed through the first channel has been reflected back through the housing first region.

2. The device of claim 1, wherein the at least two channels are integral to the light guide.

3. The device of claim 2, wherein the light guide includes an integral collecting lens positioned between the light source and the at least two channels.

4. The device of claim 3, wherein the light guide is molded from one of polycarbonate, polystyrene, acrylic, cyclic olefin copolymer, SAN styrene blend and NAS styrene blend.

5. The device of claim 2, wherein the light source comprises a Light Emitting Diode (LED), and wherein the light guide further includes an integral holder to support and position the LED.

6. The device of claim 5, further including a substrate for supporting and interconnecting electronic components, and wherein
the image sensor is attached to the substrate,
the light guide is configured for direct attachment to the substrate, and
a portion of the light guide is positioned between the substrate and the housing first region.

7. The device of claim 1, wherein each of the at least two channels further comprises an exit face and a reflecting face which internally reflects light so as cause same to emanate from the exit face.

8. The device of claim 1, wherein between 70%-90% of the divided light is directed to the first channel and between 10%-30% of the divided light is directed to the second channel.

9. The device of claim 1, wherein approximately 80% of the divided light is directed to the first channel and approximately 20% of the divided light is directed to the second channel.

10. A computer mouse, comprising:
a lower surface configured for contact with and to move across a supporting surface;
an upper housing extending from the boundary of the lower surface;
a light emitting diode (LED);
an opening formed in a portion of the lower surface and positioned so as to permit light to emanate from the opening, reflect from a region of a supporting surface, and shine back through the opening;
an illumination window formed in a portion of the upper housing; and
a light guide for transmitting a portion of the light emitted by the LED to the opening and a portion of the light emitted by the LED to the illumination window, wherein the light guide comprises a first channel and a second channel separated by a gap, the computer mouse further comprising an image sensor, the image sensor positioned to receive light from the light guide after light directed through the first channel has been reflected back through the opening, wherein the light emitted from the second channel to the illumination window is not reflected off the supporting surface and through the opening.

11. The computer mouse of claim 10, wherein the light guide includes an integral collecting lens positioned between the LED and the two channels.

12. The computer mouse of claim 10, wherein the light guide is molded from one of polycarbonate, polystyrene, acrylic, cyclic olefin copolymer, SAN styrene blend and NAS styrene blend.

13. The computer mouse of claim 10, further comprising a substrate for supporting and interconnecting electronic components, and wherein a portion of the light guide is positioned between the substrate and an inner surface of the lower surface, and a portion of the light guide extends through a hole in the substrate.

14. The computer mouse of claim 13, wherein the LED is held and positioned by the portion of the light guide extending through the hole in the substrate.

15. The computer mouse of claim 10, wherein each of the two channels comprises an exit face from which directed light emanates and a reflecting face which internally reflects directed light so as cause same to emanate from the exit face.

16. The computer mouse of claim 10, wherein:

a first of the two channels illuminates the opening, a second of the two channels illuminates the illumination window, between 70%-90% of light emanating from the light guide emanates from the first channel, and between 10%-30% of light emanating from the light guide emanates from the second channel.

17. The computer mouse of claim 16, wherein approximately 80% of light emanating from the light guide emanates from the first channel and approximately 20% of light emanating from the light guide emanates from the second channel.

18. The computer mouse of claim 16, wherein a substantial portion of the light from the second channel emanates in a direction that is 180° in the plane of the lower surface from the direction in which a substantial portion of the light from the first channel emanates.

* * * * *